May 2, 1933. W. M. TEMPLETON 1,906,498
WINDROW HARVESTER APPARATUS AND METHOD
Filed Jan. 14, 1931  2 Sheets-Sheet 1

Inventor
William M. Templeton
By [signature]
Atty.

Inventor
William M. Templeton
By H.P. Davliab
Atty.

Patented May 2, 1933

1,906,498

UNITED STATES PATENT OFFICE

WILLIAM M. TEMPLETON, OF WILLOWS, CALIFORNIA

WINDROW HARVESTER APPARATUS AND METHOD

Application filed January 14, 1931. Serial No. 508,732.

The invention relates to an apparatus and method for windrow harvesting crops.

The purpose of windrowing crops, such as the small grains, is to cure the heads thereof. Another reason is that it is important to dry out any weeds present. This curing and drying make for efficient threshing when the windrow is picked up by the pick-up harvester thresher.

It has been proposed in forming the windrow that the field stubble tops along a path predetermined in width to the width of the windrow to be laid be bent over in a manner to form an elevated stubble mat capable of supporting the windrow laid thereon in aerating position above the ground. This method works very well, but in it the cut crop is laid substantially horizontally or prostrate on the prepared stubble mat.

By the method and apparatus of the present invention it is proposed that the cut crop be moved with its stalks arranged erectly and then be deposited with the butt ends down and the head disposed the maximum distance above the ground. In fact, by moving two streams of the cut crop toward each other in a central delivery type of machine, it is possible to converge the streams to form a standing windrow in an inverted V or house top formation, thereby providing a trussed windrow which the force of wind and action of settling will not disturb, thereby giving assurance that the heads remain uppermost where they obviously cure best.

The object of the invention then is to provide an improved method and apparatus for forming a windrow which will result in efficient curing of cut crops and drying out of weeds.

Other objects will become apparent to those skilled in this art as the disclosure is more fully made.

Such objects may be achieved in a center delivery windrower by tilting the platform conveyers upwardly at an angle to the vertical whereby the crop stalks, after being cut, are conveyed in a substantially erect position with heads up and butts down to the central delivery opening. At this opening are a pair of rearwardly moving conveyers arranged in an inverted V after the fashion of a house top, said conveyers having therebeneath a rearwardly and downwardly inclined plate or support to receive the butts of stalks coming off the main platform conveyers. These middle and rearwardly moving conveyers convey the two streams of grain rearwardly with the stalks leaning against the conveyers in a manner to form the two streams of grain into an inverted V. In this position the grain leaves the plate or support and slides onto the field, thereby forming a house top windrow. This plate also functions to prepare a stubble bed capable of holding the windrow in aerating position above the ground.

The method generally then will comprise the steps of cutting the crop, conveying two streams thereof in a substantially erect position, bringing said two streams together into inverted V form, then so moving the two streams to a point of discharge, and finally depositing the cut stalks into a standing windrow of inverted V form.

In the accompanying sheets of drawings is illustrated a practicable form which the invention may assume in practice.

Figure 2:
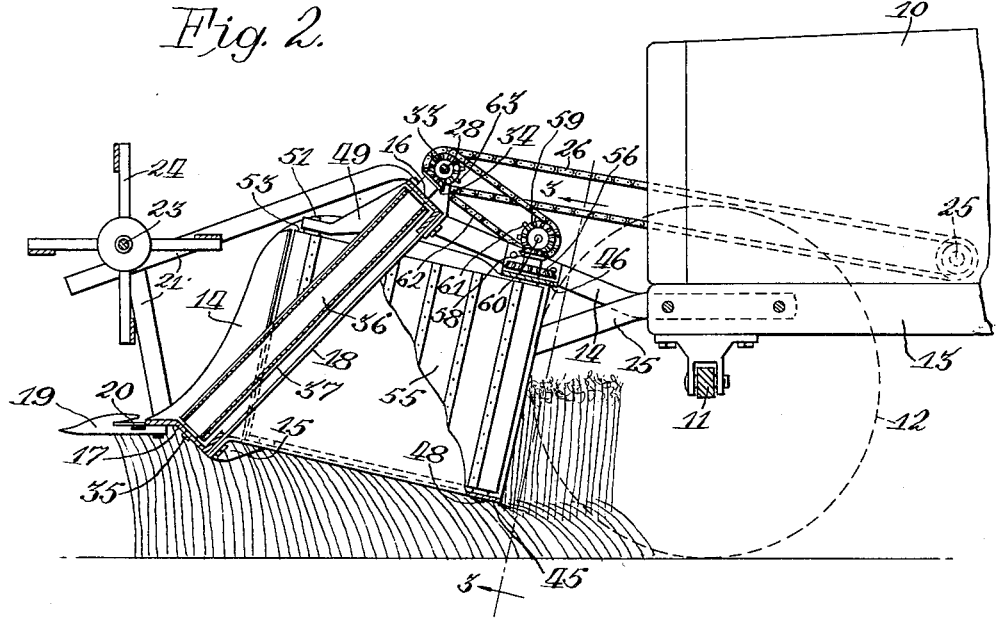
Figure 2 is a side view, mostly in section, as seen along the line 2—2 appearing in Figure 1 when viewed in the direction indicated.

For the purpose of illustration the windrower herein disclosed is of the tractor pushed type. Accordingly a tractor has generally been shown at 10, the same carried on a front axle 11 which preferably is centrally and upwardly arched, which axle is carried in the front tractor wheels 12. The frame of the tractor indicated at 13 carries a pair of spaced, forwardly and slightly upwardly extending arms 14. Said frame 13 also carries a pair of spaced, downwardly and forwardly extending arms 15. The first set of arms 14 at their forward ends serves to support a transversely extending angle bar 16, while the forward ends of the arms 15 serve to support in parallel relation to the frame piece 16, a modified form of Z-bar 17. These frame members 16 and 17 carry the harvester or header platform 18, which, as best shown in Figure 2, is inclined upwardly and rearwardly at an angle of about 45 degrees to the vertical. This platform 18 is cut out centrally between its ends to provide a large opening substantially in front of the tractor 10.

The Z-bar 17 in the usual manner is provided with the fingers guards 19, with which cooperates a sickle 20 of the reciprocatory type for cutting the crop. At their outer ends, the frame pieces 16 and 17, in any appropriate manner, carry forwardly extending supports 21 for mounting bearings 22 which serve as journals for rotatably carrying a transverse shaft 23 on which is mounted a conventional form of harvester reel 24.

The tractor 10 includes any standard form of power take-off shaft indicated at 25 serving to drive a longitudinally extending chain 26 to drive a sprocket wheel 27 carried on a continuous, transverse shaft 28 suitably journaled in bearings 29 adjacent its respective ends, which journals 29 are carried on the angle frame piece 16. One end of the shaft 28 carries a sprocket wheel 30 to drive a chain 31 that goes to a sprocket wheel 32 mounted on the reel shaft 23, and in this fashion the reel 24 is rotated in the proper direction to bat the grain toward the sickle 20.

The shaft 28 also carries bevel gear wheels 33 meshing with bevel gears 34 carried on shafts 35, which are journaled in the frame pieces 16 and 17. These shafts 35 carry and drive rollers 36, which respectively are the driving rollers for platform conveyers 37 of the usual endless apron type. The shafts 35 and rollers 36 are disposed adjacent the central platform opening. The respective outer ends of the conveyers 37 are trained around idler rollers 38 carried respectively on shafts 39 and 40, the latter shaft 40 passing loosely through its roller 38. These shafts 39 and 40 are journaled in the frame pieces 16 and 17 in any appropriate manner. The shaft 40 at its lower end carries an eccentric wheel 41 to operate a short pitman 42 that in any approved manner connects with the sickle 20 to reciprocate the same. This shaft 40, at its upper end, carries a bevel gear 43 driven from a bevel gear 44 carried on the shaft 28. In this manner, drive from the power take-off shaft of the tractor is transmitted to the sickle. Similarly, it now is clear how the two platform conveyers 37 are driven, it being understood that the upper run of these conveyers 37 moves toward the central delivery opening in the platform 18. It will then be understood that the grain or other crop cut by the sickle 20 is batted back by the wheel 24 and thrown onto the conveyers 37, said conveyers then moving the grain in substantially erect position toward the central delivery opening.

Figure 1:
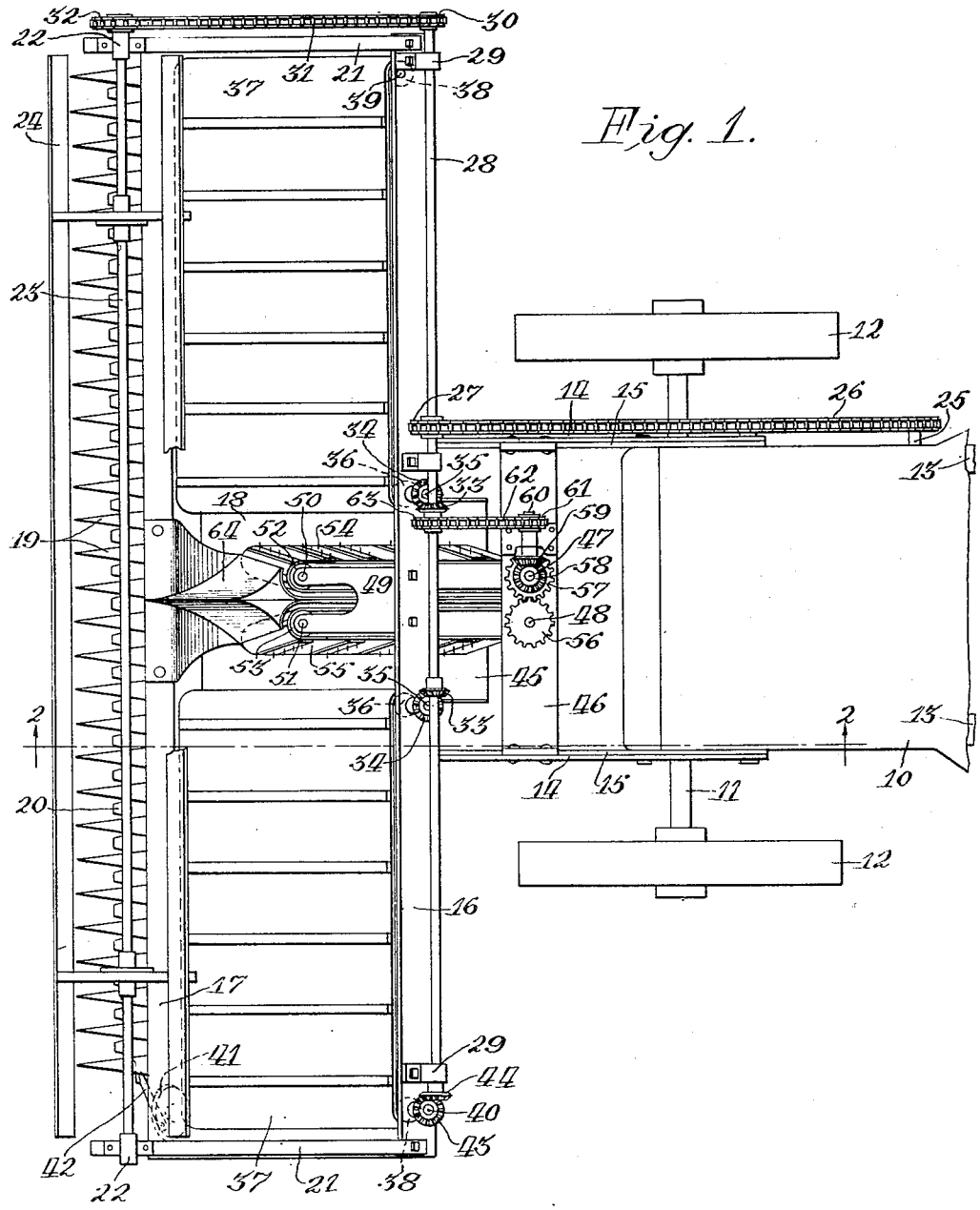
Figure 1 is a top plan view of the windrow harvester associated with a tractor, the forward part of the latter only being shown.
Figure 3:
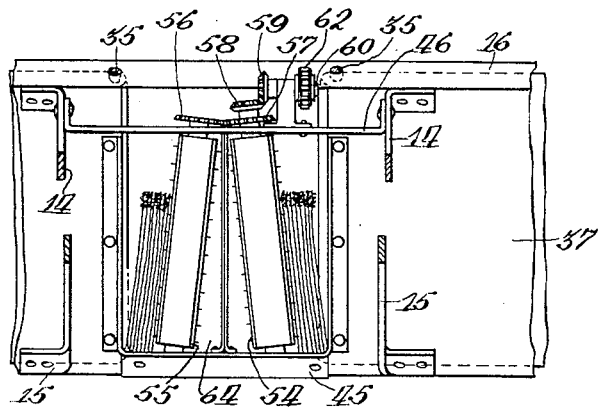
Figure 3 is a rear detail view, as seen along the line 3—3 shown in Figure 2 when looking in the direction indicated; and, Figure 4 is a detail cross cut view through the improved standing windrow in inverted V form as formed by the apparatus and in accordance with the method of this invention.
Figure 4:
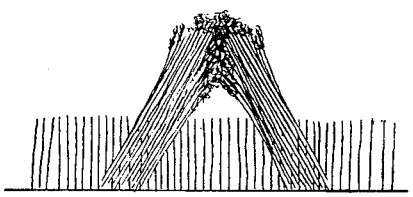

The Z-bar 17 has connected to it a rearwardly and downwardly inclined plate or support 45 that receives the butt ends of the cut crop coming from the discharge ends of the conveyers 37. This plate also serves to bend, as indicated in Figure 2, the tops of standing field stubble ahead, thereby providing an elevated, cushioned, stubble mat capable of supporting a windrow in aerating position off the ground. The arms 14 heretofore described, as best shown in Figures 1 and 2, carry a cross-plate 46 which serves to journal the upper ends of shafts 47 and 48, respectively. These shafts are inclined toward each other in the form of an inverted V and have their lower ends appropriately journaled in the plate 45. The upper angle bar or frame piece 16 carries a forwardly extending bracket 49 which, at its front ends, journals two shafts 50 and 51. These shafts 50 and 51 also are inclined toward each other in the form of an inverted V and, furthermore, also have their lower ends appropriately journaled for rotation in the plate 45 toward its front end. The shafts 50 and 51, respectively, carry idler rollers 52 and 53, around which are respectively trained endless apron type conveyers 54 and 55, which are provided with pronged slats, as shown, for better engaging the erectly moving grain coming off the conveyers 37. The shafts 47 and 48 also carry the usual conveyer rollers, the roller for the conveyer 55 being driven by the bevel gear 56 carried by the upper end of the shaft 48, said bevel gear 56 being in mesh with a bevel gear 57 formed as a part of bevel gear 58 in mesh with a bevel gear 59 carried on a shaft 60 driven from a sprocket wheel 61, in turn driven by a chain 62 from a sprocket wheel 63 operated by the shaft 28 heretofore described. By this transmission described, the outer runs of the conveyers 54 and 55 are driven rearwardly, so that grain coming off the conveyer 37 falls against these lean-to conveyers 54 and 55 in such a manner that the pronged slats thereon carry the grain along erectly with heads up and butts down across and down the plate 45. These conveyers 54 and 55 thus form the two converging streams of cut crop coming from the conveyers 37 into an inverted V and in such form the crop leaves the plate 45 in the manner indicated in Figures 2 and 3 and is thus deposited upon the stubble bed in a standing windrow, as shown in Figure 4. Such a windrow obviously is trussed and thus has an inherent resistance against the force of wind and settling action, thereby insuring that the heads will remain in their maximum uppermost positions above the ground where they will best cure.

In advance of the conveyers 54 and 55 the Z-bar 17 has connected thereto a sheet metal form 64 after the fashion of a snow plow, which serves to deflect that grain cut in advance of the platform opening laterally and rearwardly where it can be picked up in substantially erect position by the conveyers 54 and 55 to be moved backwardly to become a part of the windrow in formation.

From this disclosure it is now apparent that an improved apparatus has been provided for forming a new type of windrow assuming an inverted V form in such a manner that the heads of the grain will be disposed in a standing windrow a maximum distance above the ground where the best aeration takes place, and consequently the grain will be better and more evenly cured.

The windrow obviously can be formed independently of any apparatus, and thus a method of windrow harvesting has been provided, which generally comprises the step of cutting a crop and moving the same in two streams which are merged and then moved in substantially erect position and so discharged in inverted V form, to provide a standing windrow.

It is the intention to cover all such changes and modifications of the illustrative example of the invention herein shown which do not depart from the spirit and scope of said invention, which has been defined in the appended claims.

What is claimed is:

1. The method of harvesting a standing crop which consists in cutting the crop, conveying the same in two streams toward each other as a loose crop, and then bringing said two streams together to form an erect inverted V and so depositing the cut crop into a standing windrow with butts down and heads up.

2. The method of harvesting a standing crop which consists in cutting the crop, conveying the same loosely in two divided streams towards each other with the cut crop maintained in a substantially erect position, and then bringing said two streams together to form an inverted V and so depositing the cut crop into a standing windrow with butts and heads up.

3. The method of harvesting a standing crop which consists in cutting the crop along a transverse line, conveying the same transversely in two streams towards each other as a loose crop with the said cut crop maintained in a substantially erect position, and then bringing said two streams together and moving the same rearwardly in the form of an inverted V and so depositing the cut crop into a standing windrow with butts down and heads up.

4. The method of harvesting a standing crop which consists in cutting the crop to leave a stubble, deflecting the stubble along a path of predetermined width, conveying the cut crop in two streams towards each other, and bringing said two streams together to form an inverted V and so depositing the cut crop into a standing windrow on said deflected stubble.

5. The method of harvesting a standing crop which consists in cutting the crop to leave a stubble, deflecting the stubble along a path of predetermined width, conveying the cut crop in two divided streams towards each other with the cut crop held in a substantially erect position, and then bringing said two streams together to form an inverted V and so depositing the cut crop into a standing windrow on said deflected stubble.

6. The method of harvesting a standing crop which consists in cutting the crop along a transverse line to leave stubble, deflecting the stubble along a longitudinal path of predetermined width, conveying the cut crop in two streams towards each other with the cut crop held in a substantially erect position, and then bringing said two streams together to form an inverted V and so depositing the cut crop into a standing windrow on said deflected stubble.

7. A windrow harvester comprising means to cut a crop, means to convey the same transversely in two divided streams toward each other to a point of discharge with the crop held in substantially erect position, and means to move said streams rearwardly together from said point of discharge in the form of an inverted V and so to deposit the same on the field in standing windrow formation.

8. A windrow harvester comprising means to cut a crop, means to convey the same transversely in two divided streams toward each other to a point of discharge with the crop held in substantially erect position, a stubble bending plate between said conveying means, and means above the plate to move said streams with the crop in substantially erect position rearwardly together from said point of discharge in the form of an inverted V and so to deposit the same on the bent stubble in a standing windrow.

9. A windrow harvester comprising a transverse header platform inclined rearwardly slightly from the vertical, a conveyer on said inclined platform, a rearwardly and downwardly inclined plate at the discharge end of said conveyer, and means on said plate to engage the cut crop coming from the conveyer and to cause the crop to be discharged on the field in substantially erect position with the butts down and heads up in a maximum distance above the ground.

10. A windrow harvester comprising a transverse header platform inclined rearwardly slightly from the vertical, a transversely moving conveyer on said inclined platform, a rearwardly and downwardly inclined plate at the discharge end of said conveyer, and conveyer means on said plate to receive the cut crop in substantially erect position from the conveyer and for causing the crop to be discharged on the field in a windrow with the butts down and heads up a maximum distance above the ground in such substantially erect position.

11. A windrow harvester comprising a transverse header platform, a sickle on said platform for heading a crop, said platform having a discharge opening intermediately of its ends, conveyers on the platform at each side of said opening for moving the cut crop to said opening, and a pair of conveyers located in said opening to receive the cut crop from the first conveyers to move said cut crop rearwardly and to discharge the crop into a standing windrow having its sides leaned toward each other in an inverted V with the heads uppermost and butts down.

12. A windrow harvester comprising a transverse header platform inclined upwardly and rearwardly to a position approaching the vertical, means on said platform for heading a crop, said platform having a discharge opening intermediately of its ends, conveyers on the platform at each side of said opening for moving the cut crop to said opening, and a pair of conveyers located in said opening and leaned towards each other to form an inverted V, said leaned conveyers receiving the cut crop from the first conveyers to move said cut crop rearwardly and to discharge the crop into a standing windrow having its sides leaned towards each other in an inverted V with the heads uppermost and butts down.

13. A windrow harvester comprising a transverse header platform, means on said platform for heading a crop, said platform having a discharge opening intermediately of its ends, conveyers on the platform at each side of said opening for moving the cut crop in substantially erect position to said opening, and conveyers located in said opening to receive the cut crop from the first conveyers to move said cut crop rearwardly and to discharge the crop into a standing windrow having its sides leaned toward each other in an inverted V with the heads uppermost and butts down.

14. A windrow harvester comprising a tranverse header platform, means on said platform for heading a crop, said platform having a discharge opening intermediately of its ends, conveyers on the platform at each side of said opening for moving the cut crop to said opening, a pair of conveyers located in said opening to receive the cut crop from the first conveyers to move said cut crop in substantially erect position rearwardly and to discharge the crop into a standing windrow having its sides leaned towards each other in an inverted V with the heads uppermost and butts down, and a deflector carried by the platform in advance of the pair of conveyers in the opening.

15. A windrow harvester comprising a transverse header platform, means on said platform for heading a crop, said platform having a discharge opening intermediately of its ends, conveyers on the platform at each side of said opening for moving the cut crop to said opening, a stubble bending plate in said opening, and a pair of conveyers located on said plate to receive the cut crop from the first conveyers to move said cut crop rearwardly and to discharge the crop substantially erectly onto the bent stubble into a standing windrow having its sides leaned towards each other in an inverted V with the heads uppermost and butts down.

16. A windrow harvester comprising a transverse header platform inclined upwardly and rearwardly to a position approaching the vertical, means on said platform for heading a crop, said platform having a discharge opening intermediately of its ends, conveyers on the platform at each side of said opening for moving the cut crop in substantially erect position to said opening, a stubble bending plate in said opening, and a pair of conveyers located on said plate to receive the cut crop from the first conveyers to continue movement of said cut crop in erect position rearwardly and to discharge the crop into a standing windrow on the bent stubble having its sides leaned towards each other in an inverted V with the heads uppermost and butts down.

In testimony whereof I affix my signature.

WILLIAM M. TEMPLETON.